June 16, 1942.    G. W. DUNHAM    2,286,720
WASHING MACHINE
Filed Dec. 31, 1941

Inventor:
George W. Dunham,
by Harry E. Dunham
His Attorney.

Patented June 16, 1942

2,286,720

UNITED STATES PATENT OFFICE 2,286,720

WASHING MACHINE

George W. Dunham, Westport, Conn., assignor to General Electric Company, a corporation of New York Application December 31, 1941, Serial No. 425,164

4 Claims. (Cl. 74—81)

The present invention relates to a variable stroke oscillating mechanism suitable for operating washing machine agitators and the like.

The object of my invention is to provide an improved construction and arrangement in such oscillating mechanism, and for a consideration of what I believe novel and my invention, attention is directed to the following description and the claims appended thereto.

Figure 1:
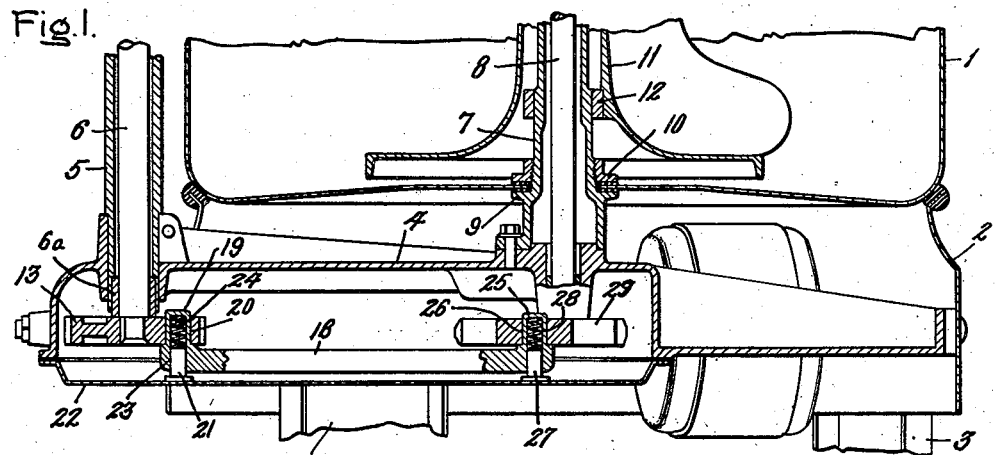
Figure 3:
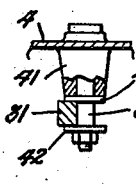
Figure 2:
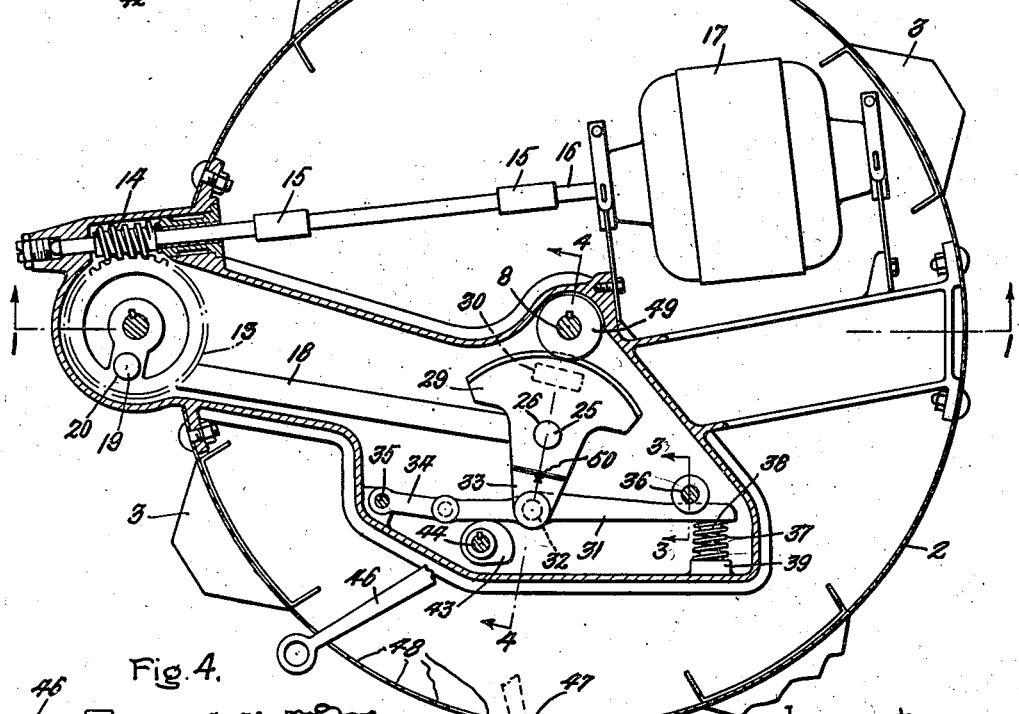
Figure 4:
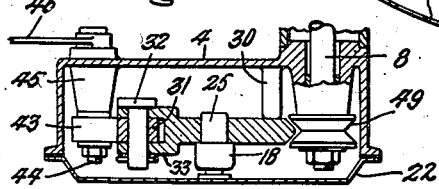

In the accompanying drawing, Fig. 1 is an elevation in section along line 1—1 of Fig. 2 of a washing machine having a variable stroke oscillating mechanism embodying my invention; Fig. 2 is a sectional plan view of the washing machine; Fig. 3 is a sectional view taken on line 3—3 of Fig. 2; and Fig. 4 is a sectional view taken on line 4—4 of Fig. 2.

Referring to the drawing, there is shown a washing machine having a tub 1 supported on the upper edge of a cylindrical skirt 2 to which are secured supporting legs 3. Extending diametrically across the skirt and fixed at each end thereto is a gear casing 4 having a wringer post 5 carrying a bearing 6a in which is journaled a wringer drive shaft 6 and an agitator post 7 in which is journaled an agitator shaft 8. The wringer post 5 extends up along one side of the tub, and at the upper end (not shown) is provided with a suitable mounting for the conventional wringer. The agitator post 7 extends up through the bottom of the tub which is clamped between a shoulder 9 on the agitator post and a nut 10 threaded on the post. The tubular body 11 of a bladed agitator depends around the agitator post and is guided thereon by means of a bearing 12 fixed in the lower end of the agitator.

Fixed to the lower end of the wringer drive shaft 6 is a worm gear 13 driven by a worm 14 connected through flexible couplings 15 to the shaft 16 of an electric motor 17 supported on the gear casing 4. Beneath the worm gear 13 is a connecting rod 18 having a crank pin 19 rotatably fitting in a socket 20 in the worm gear. The crank pin is held in the socket 20 by means of a friction pin 21 having its lower end bearing on the bottom cover 22 of the gear casing and having its upper end extending into a recess 23 in the crank pin and bearing against a spring 24 arranged between the upper end of the friction pin 21 and the bottom of the recess 23. The other end of the connecting rod 18 is provided with a crank pin 25 which rotatably fits in a socket 26 in a segment gear 29 and is held in the socket by means of a friction pin 27 and a spring 28 of the same construction as the friction pin 21 and the spring 24. The friction pin 21 holds the crank end of the connecting rod 18 in the worm gear 13 and also resiliently holds the worm gear 13 against the lower end of the bearing 6a in which the wringer drive shaft is journaled. The friction pin 27 holds the driving end of the connecting rod 18 in the segment gear 29 and also resiliently holds the segment gear against a stop 30 integral with the top wall of the gear casing.

The segment gear 29 is pivotally supported on a link 31 by means of a pivot pin 32 extending through forked ends 33 on the segment gear straddling the supporting link 31. One end of the supporting link 31 is pivotally connected to an arm 34 hinged at 35 on the gear casing. The other end of the supporting link 31 is urged against a stop 36 by means of a compression spring 37 arranged between a seat 38 on the supporting link 31 and a seat 39 on the side wall of the gear casing. The stop 36 (Fig. 3) comprises a pin fixed in a boss 41 depending from the top wall of the gear casing and carrying spacing washers 42 which engage the upper and lower sides of the supporting link 31 and maintain it in alignment. The compression spring 37 tends to pivot the supporting link 31 in a counterclockwise direction about the stop 36, as viewed in Fig. 2, and urges the supporting link against a cam 43 fixed to the lower end of a shaft 44 journaled in a boss 45 depending from the top wall of the gear casing. The upper end of the shaft 44 has a control lever 46 fixed thereto which extends out through a slot 47 in the supporting skirt 2. The lower edge of the slot 47 is provided with a series of notches 48 into which the control lever 46 may be seated so as to adjustably position the cam 43. As the cam 43 is turned by movement of the control lever 46, the supporting link 31 and, accordingly, the segment gear 29 which is pivotally carried thereon is moved toward and away from a pinion 49 fixed to the lower end of the agitator shaft 8.

The pinion 49 and the segment gear 29 are provided with cooperating friction driving surfaces which may comprise a V groove in the pinion 49 and a V-shaped projection on the segment gear 29. The friction surface on the segment gear 29 comprises an arc having its center at a point 50 which is between the agitator shaft 8 and the pivot pin 32 for the segment gear. Accordingly the central part of the friction surface on the segment gear will project beyond an arc concentric with the axis about which the segment gear is oscillated. In other words, part of the friction surface of the segment gear is on one side of an arc concentric with the axis of oscillation of the segment.

When the control lever 46 is in the full line position of Fig. 2, the segment gear 29 is out of contact with the pinion 49 and the pinion will accordingly remain stationary. As the control lever 46 is moved toward the dotted line position of Fig. 2, the segment gear 29 is gradually moved toward the pinion and the central section of the segment gear comes into friction driving contact with the pinion and results in a somewhat less than full stroke oscillation of the agitator shaft 8. When the control lever 46 is in the dotted line position of Fig. 2, the segment gear is in friction driving contact with the pinion 45 throughout its full stroke of oscillation. Excessive pressure between the segment gear and pinion is prevented by the compression spring 37 which provides a givable support for the axis of the segment gear permitting movement thereof relative to the adjusting cam 43.

With the foregoing construction it is possible to select the stroke of oscillation of the agitator shaft by the position of the control lever 46.

What I claim as new and desire to secure by Letters Patent of the United States, is:

1. A variable stroke oscillating mechanism comprising a segment gear and a pinion, means for oscillating the segment gear about an axis, means for adjusting the axis of the segment gear toward and away from the pinion, and cooperating friction surfaces on the pinion and segment gear, the friction surface on the segment gear having a part on one side of an arc concentric with the axis of oscillation whereby the length of friction contact between the segment and the pinion varies with the adjustment of the axis of the segment.

2. A variable stroke oscillating mechanism comprising a segment gear and a pinion, means for oscillating the segment gear about an axis, means for adjusting the axis of the segment gear toward and away from the pinion, and cooperating friction surfaces on the pinion and segment gear, the friction surface on the segment gear comprising an arc concentric with a point between the pinion and the axis of oscillation whereby the friction contact between the segment and the pinion varies with the adjustment of the axis of the segment.

3. In a variable stroke oscillating mechanism, a segment gear and pinion, a pivotal support for the segment gear, means for oscillating the segment gear about said support, means for adjusting the support toward and away from the pinion, spring means acting on the support to limit the pressure between the segment gear and pinion, and cooperating friction surfaces on the pinion and segment gear, the friction surface on the segment gear having a part on one side of an arc concentric with the pivotal support whereby the friction contact between the segment gear and pinion varies with the adjustment of the support for the segment gear.

4. A variable stroke oscillating mechanism comprising a segment gear and a pinion, means for oscillating the segment gear about an axis, means for adjusting the axis of the segment gear toward and away from the pinion, spring means providing a givable support for the axis of the segment gear permitting movement thereof relative to the adjusting means, and cooperating friction surfaces on the pinion and segment gear, the friction surface on the segment gear having a part on one side of an arc concentric with the axis of oscillation whereby the length of friction contact between the segment and the pinion varies with the adjustment of the axis of the segment.

GEORGE W. DUNHAM.